United States Patent [19]

Richards et al.

[11] Patent Number: 5,705,547
[45] Date of Patent: Jan. 6, 1998

[54] MOISTURE-CURE URETHANE ADHESIVES CONTAINING γ-BUTYROLACTONE

[75] Inventors: James L. Richards; Larry F. Brinkman, both of Woodstock, Ill.

[73] Assignee: Morton International, Inc., Chicago, Ill.

[21] Appl. No.: 730,249

[22] Filed: Oct. 15, 1996

Related U.S. Application Data

[63] Continuation of Ser. No. 502,499, Jul. 14, 1995, abandoned.
[51] Int. Cl.$^6$ ............................................. C08G 18/10
[52] U.S. Cl. ..................... 524/111; 524/753; 528/59; 528/905; 156/307.7
[58] Field of Search ............ 528/59, 905; 524/753, 524/111; 156/307.7

[56] References Cited

U.S. PATENT DOCUMENTS

| | | | |
|---|---|---|---|
| 3,707,521 | 12/1972 | De Santis | 260/37 N |
| 3,779,794 | 12/1973 | De Santis | 117/72 |
| 4,176,212 | 11/1979 | Brack | 428/423 |
| 4,912,152 | 3/1990 | Nejigaki et al. | 524/729 |
| 4,958,685 | 9/1990 | Hihara et al. | 166/291 |

*Primary Examiner*—Rachel Gorr
*Attorney, Agent, or Firm*—Wayne E. Nacker; Gerald K. White

[57] ABSTRACT

A one-part, moisture-cure urethane adhesive composition contains between 1 and 10 phr γ-butyrolactone which acts as a moisture diffusion agent, thereby promoting a more rapid cure.

4 Claims, No Drawings

MOISTURE-CURE URETHANE ADHESIVES CONTAINING γ-BUTYROLACTONE

This is a continuation of application Ser. No. 08/502,499 filed on Jul. 14, 1995, now abandoned.

The present invention is directed to moisture-cure urethane adhesives, and particularly to moisture-cure urethane adhesives containing γ-butyrolactone as a moisture diffusing agent.

BACKGROUND OF THE INVENTION

One-part, moisture-cure adhesives are well known. They are useful as structural adhesives, such as for bonding polymeric foam to wood, glass to metal, and wood to wood, e.g., in the production of I-joists. Such compositions are also useful as sealants and coatings, and the term "adhesive" as used herein is intended to include similar moisture-cured urethane compositions, whether used as an adhesive or as a sealant or as a coating. Examples of such compositions are found in U.S. Pat. Nos. 3,707,521, 3,779,794 and 4,176,212, the teachings of each of which are incorporated herein by reference. In a typical adhering process using one-part, moisture-cure adhesives, a layer of adhesive is applied to a substrate. A thin layer of moisture is applied to the surface of the adhesive layer, e.g., by spraying. The water acts as the curative for the adhesive.

In some cases, a moisture-cure adhesive may be simply a polyfunctional (NCO functionality of two or more) isocyanate, either a monomer, short chain isocyanate polymer (oligomer), or monomer/oligomer mixture. Most commonly, however, the moisture-cure adhesive comprises urethane prepolymers which are isocyanate-capped short-chain polymers, such as polyesters, polyethers and polyester/polyols. One-part moisture-cure adhesives do not contain an internal cross-linking agent, water being relied upon to cross-link the adhesive. However, the adhesive may, and often does, contain a catalyst for promoting a more rapid moisture-cure. The adhesive may be unfilled or may optionally contain filler.

The invention is directed generally to the use of γ-butyrolactone as a moisture-diffusion agent in one-part, moisture-cure adhesives. Because moisture is applied to a surface of the adhesive, one of the determinates of the curing rate of any moisture-cure adhesive is the diffusion rate of the water into the adhesive layer. It is found that γ-butyrolactone, when admixed in low levels into a moisture-cure urethane adhesive, promotes water diffusion into the adhesive layer and thereby promotes a more rapid cure.

SUMMARY OF THE INVENTION

To a moisture-cure urethane adhesive is added between about 1 and about 10 parts per hundred parts resin (phr) by weight γ-butyrolactone, preferably no more than about 10 phr, and most preferably between about 2 and about 3 phr. When a layer of adhesive is applied to a substrate and a layer of moisture applied to the adhesive layer, the γ-butyrolactone promotes diffusion of water into the adhesive layer, thereby reducing cure time of the adhesive.

DETAILED DESCRIPTION OF CERTAIN PREFERRED EMBODIMENTS

Herein, unless otherwise noted, percentages are expressed by weight, in parts per hundred resin (phr), relative to the urethane resin. The urethane resin as used herein consists of the total amount of polyisocyanate monomers, polyisocyanate oligomers, and polyisocyanate end-capped polymers, such as end-capped polyesters and end-capped polyethers.

To promote moisture-cure, generally it is necessary to add at least about 1 phr of γ-butyrolactone. Adding more than about 10 phr γ-butyrolactone is undesirable because instability may result. Generally no more than about 5 phr are added, and best results have been achieved with γ-butyrolactone used at about 2 to about 3 phr.

Moisture-cure urethane compositions are based on polyisocyanates. Polyisocyanates which may be used include aromatic, aliphatic, and cycloaliphatic polyisocyanates and combinations thereof. Representative examples are diisocyanates such as m-phenylene diisocyanate, 2,4-toluene diisocyanate, 2,6-toluene diisocyanate, mixtures of 2,4-toluene diisocyanate and 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 4,4'-biphenylene diisocyanate, 3,3'-dimethoxy 4,4'-biphenyl diisocyanate, 3,3 dimethyl-4,4'-biphenyl diisocyanate, and 3,3'-dimethyl-4,4'-diphenylmethane diisocyanate; the triisocyanates such as 4,4',4"-triphenylmethane triisocyanate, polymethylene polyphenylene polyisocyanate and 2,4,6-toluene triisocyanate; and the tetraisocyanates such as 4,4'-dimethyl-2,2',5,5'-diphenylmethane tetraisocyanate. Especially useful due to their availability and properties are toluene diisocyanate, 4,4'-diphenylmethane diisocyanate (MDI) and polymethylene polyphenylene polyisocyanate. Polymethylene polyphenylene polyisocyanate is a product which results from the phosgenation of an aniline-formaldehyde condensation product; it is sometimes called "crude MDI" which typically contains between 40 and 60 wt % MDI and between 60 and 40 wt % oligomeric MDI, typically oligomers of 2–5 units.

While polyisocyanates, such as crude MDI, can be used alone as moisture-cure urethane adhesives, it is most common that the adhesive includes urethane prepolymers formed by reacting polyisocyanates, such as those described above, with polyols, including polyol monomers and/or polyhydroxyl functional polymers, such as OH-functional polyethers, polyesters, polyester/polyols and mixtures thereof. To provide for moisture cure, the NCO to OH ratio must be at least greater than 1:1 and most generally an NCO/OH ratio of at least about 1.1:1 is reacted. There is no upper limit on the NCO/OH ratio which can be used, because, as noted above, pure polyisocyanate can function as a moisture-cure adhesive. However, when a polyisocyanate and hydroxyl-functional polymer are reacted to form urethane prepolymers, the NCO/OH ratio is typically not above about 10:1. An excess of NCO/OH means that an adhesive composition contains some unreacted polyisocyanate, monomer and/or oligomer. Hydroxyl functional polymers may be straight-chained or branched, the degree of branching being determined by the amount of monomer having functionality greater than 2 used to form the prepolymers. The polyols used in the invention can range in molecular weight (weight average) from about 250 to about 8000.

Polyethers for forming urethane prepolymers useful in the invention maybe prepared by the reaction of an alkylene oxide with a polyhydric alcohol. Alkylene oxides which may be employed in the preparation of the polyethers useful in the present invention include ethylene oxide, propylene oxide, the isomeric normal butylene oxides, hexylene oxide, octylene oxide, dodecene oxide, methoxy and other alkoxy propylene oxides, styrene oxide and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any above alkylene oxides may also be employed.

Polyhydric alcohols which may be reacted with the alkylene oxides to prepare the hydroxyl functional polyethers which may be employed in the invention include but are not limited to ethylene glycol, propylene glycol, the isomeric butylene glycols, 1,5-pentane diol, 1,6-hexanediol, glycerol, trimethylolpropane, 1,2,6-hexanetriol, pentaerythritol, sorbitol, sucrose alphamethyl glycoside and mixtures thereof.

The polyhydroxy functional alcohols may be reacted with polycarboxylic acids (or their anhydrides where applicable) to form hydroxyl-terminated polyesters which are then end-capped with polyfunctional isocyanates to form polyester-based urethane prepolymers useful in the invention. Examples of such polycarboxylic acids useful for forming polyesters in accordance with the invention include, but are not limited to, adipic acid, maleic acid, trimellitic anhydride, phthalic acid, tetrahydrophthalic acid, hexahydrophthalic acid, sebacic acid, terephthalic acid, isophthalic acid, 1,3- and 1,4-cyclohexane-dicarboxylic acids and mixtures thereof.

Likewise, the urethane prepolymer may be a polyester/polyether, having both ester and ether linkages and end-capped with a polyisocyanate. Or a mixture of polyester, polyether, and/or polyether/polyesters may reacted with polyisocyanate to form the moisture-cure adhesive prepolymers.

The urethane moisture-cure adhesive need not contain a catalyst, but may contain up to about 0.1 phr of a catalyst, such as a tertiary amine catalyst or a tin catalyst, e.g., dibutyl tin dilaurate. If a catalyst is used, it is typically used at a level of at least 0.005 phr. The use of γ-butyrolactone as a moisture diffusing agent to effect a more rapid cure can have the advantage of achieving in any particular formulation a similar cure time with reduced level of relatively expensive catalyst.

Urethane moisture-cure adhesives are generally solvent-free and therefore have substantially no volatile components. γ-butyrolactone has a boiling point of 210° C. and does not evaporate to any significant extent during curing, which generally takes place at ambient temperatures up to about 55° C. Rather, the γ-butyrolactone remains in the cured adhesive and serves a plasticizing function.

The moisture-cure urethene may be unfilled, but may contain fillers up to about 50 phr. Examples of fillers include silicas, clays, talcs, carbon black, and titanium dioxide. Also, other known additives, such as antioxidants and UV-absorbers may be added in minor amounts.

The invention will now be described in greater detail by way of specific example.

EXAMPLE

A 1-part, 100% non-volatile material (NVM), moisture-cure urethane product was formed from crude MDI (50 wt%), a 2000 Mw polypropylene oxide (35 wt %), and a 1000 Mw polyester diol (15 wt %). The NCO/OH ratio used was 5.5:1. The reactants were combined, under agitation, in a glass-lined reactor, heated to 80° C. and held for three hours. The reaction product was then cooled to 50° C. and vacuum degassed. Dibutyl tin dilaurate was then added (0.07% phr). Agitation and vacuum degassing was continued until the mixture reached 30° C.; then it was discharged to clean dry containers. To this adhesive was added various levels of γ-butyrolactone.

A cure rate was determined by drawing down a 2 mil wet film onto a clean piece of plate glass. The glass plate with the applied adhesive was then placed onto a custom piece of equipment designed exclusively to check cure of moisture reactive urethane.

The machine is equipped with a sled that moves at a constant rate. The equipment is kept in a room held at a constant temperature and humidity (75±2° F.(24±1° C.)/50±2% RH). The plate is placed onto the sled and a digital timer started. A fixed stainless steel stylus is lowered into the wet adhesive film and as the sled moves, it is dragged through the wet film. As the adhesive cures, the stylus begins to ride on top of cured adhesive. The transition point of uncured to cured adhesive film is manifested by an arrowhead shaped end point. The cure time is then determined by ratio of the distance to the end point, to the overall length traveled, times the total elapsed time.

Effect of γ-butyrolactose (GBL) on Cure of 1-Part 100% NVM, Moisture Cured Urethane

| GBL (phr) | Cure Rate (min.) |
| --- | --- |
| 0.0 | 140 |
| 1.0 | 95 |
| 1.5 | 89 |
| 2.0 | 79 |

What is claimed is:

1. In a method of bonding a first substrate to a second substrate comprising interposing between said substrates, in the presence of moisture, a moisture-curable urethane composition comprising a urethane resin component comprising polyfunctional isocyanate, said composition having no active hydrogen or urethane-reactive curative, said composition curing in the presence of moisture at ambient temperatures, the improvement wherein said urethane adhesive composition further contains between about 1 and about 10 parts per hundred parts resin by weight γ-butyrolactone as a moisture diffusion agent.

2. The method according to claim 1 wherein said composition contains between about 1 and about 5 phr by weight λ-butyrolactone.

3. The method according to claim 1 wherein said composition contains between about 2 and about 3 phr by weight λ-butyrolactone.

4. The method according to claim 1 wherein said composition is the reaction product of polyfunctional isocyanate with a hydroxyl-terminated polymer selected from the group consisting of polyether, polyester, polyester/polyether and mixtures thereof, the reaction mixture having an NCO/OH ratio of between about 1.1:1 and about 10:1.

* * * * *